US008693439B2

(12) United States Patent
Vesely et al.

(10) Patent No.: US 8,693,439 B2
(45) Date of Patent: Apr. 8, 2014

(54) REDUCED PING PONG OCCURRENCE DURING HANDOVER

(75) Inventors: Alexander Vesely, Feldbach (AT); Volker Breuer, Botzow (DE)

(73) Assignee: Nokia Siemens Networks Oy, Espoo (FI)

( * ) Notice: Subject to any disclaimer, the term of this patent is extended or adjusted under 35 U.S.C. 154(b) by 931 days.

(21) Appl. No.: 12/231,792

(22) Filed: Sep. 3, 2008

(65) Prior Publication Data

US 2009/0104909 A1 Apr. 23, 2009

Related U.S. Application Data

(60) Provisional application No. 60/967,463, filed on Sep. 4, 2007.

(51) Int. Cl.
*H04W 4/00* (2009.01)
*H04W 36/00* (2009.01)

(52) U.S. Cl.
USPC .......................................... 370/332; 455/436

(58) Field of Classification Search
USPC ...................... 370/331–335; 455/436–444
See application file for complete search history.

(56) References Cited

U.S. PATENT DOCUMENTS

| | | | | |
|---|---|---|---|---|
| 6,453,176 | B1 * | 9/2002 | Lopes et al. ................ | 455/562.1 |
| 7,310,527 | B2 * | 12/2007 | Jagadeesan et al. ........... | 455/436 |
| 7,489,929 | B2 * | 2/2009 | Das et al. ...................... | 455/436 |
| 7,697,934 | B2 * | 4/2010 | Vikberg et al. ............. | 455/435.2 |
| 2002/0160781 | A1 * | 10/2002 | Bark et al. .................... | 455/450 |
| 2003/0190916 | A1 | 10/2003 | Celedon et al. ............... | 455/437 |
| 2004/0102194 | A1 * | 5/2004 | Naghian et al. ............... | 455/436 |
| 2005/0197124 | A1 * | 9/2005 | Kang et al. .................... | 455/439 |
| 2006/0084438 | A1 * | 4/2006 | Kwon ........................... | 455/436 |
| 2007/0091844 | A1 * | 4/2007 | Huang et al. .................. | 370/331 |
| 2007/0093201 | A1 * | 4/2007 | Hsu et al. ..................... | 455/3.04 |
| 2007/0123252 | A1 | 5/2007 | Tronc et al. ................... | 455/427 |
| 2007/0133472 | A1 * | 6/2007 | Kim et al. ..................... | 370/332 |
| 2007/0191013 | A1 * | 8/2007 | Gunnarsson et al. ......... | 455/438 |
| 2008/0076428 | A1 * | 3/2008 | Jagadeesan et al. .......... | 455/436 |
| 2008/0096560 | A1 * | 4/2008 | Felske et al. ................. | 455/436 |
| 2009/0163223 | A1 * | 6/2009 | Casey .......................... | 455/453 |
| 2010/0197311 | A1 * | 8/2010 | Walldeen et al. ............. | 455/444 |

FOREIGN PATENT DOCUMENTS

EP  1816794  8/2007

OTHER PUBLICATIONS

3GPP TS 36.300, V8.5.0 (May 2008), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

* cited by examiner

*Primary Examiner* — Ayaz Sheikh
*Assistant Examiner* — Hoang-Chuong Vu
(74) *Attorney, Agent, or Firm* — Harrington & Smith

(57) ABSTRACT

A method includes handing over a user equipment from a first network access node to a second network access node and, at the second network access node, not considering the first network access node as a handover candidate from the second network access node until at least one of: (a) an amount of time since the hand over from the first network access node exceeds a first threshold amount; (b) there is a change in a channel condition between the user equipment and the first access node that exceeds a second threshold amount.

33 Claims, 4 Drawing Sheets

REDUCED PING PONG OCCURRENCE DURING HANDOVER

CLAIM OF PRIORITY FROM COPENDING PROVISIONAL PATENT APPLICATION

This patent application claims priority under 35 U.S.C. '119(e) from Provisional Patent Application No. 60/967,463, filed Sep. 4, 2007, the disclosure of which is incorporated by reference herein in its entirety.

TECHNICAL FIELD

The exemplary and non-limiting embodiments of this invention relate generally to wireless communication systems, methods, devices and computer programs embodied on computer-readable medium and, more specifically, relate to techniques to handover a mobile communication device from one network access node to another.

BACKGROUND

Various abbreviations that may appear in the specification and/or in the drawing figures are defined as follows:
3GPP third generation partnership project
UTRAN universal terrestrial radio access network
Node B base station
UE user equipment
HO handover
EUTRAN evolved UTRAN
eNB EUTRAN Node B (evolved Node B)
MME mobility management entity
SAE system architecture evolution
RLC radio link control
LTE long term evolution
OFDMA orthogonal frequency division multiple access
SC-FDMA single carrier, frequency division multiple access
UL uplink
DL downlink
O&M operation and maintenance
RAT radio access technology A communication system known as evolved UTRAN (E-UTRAN, also referred to as UTRAN-LTE or as E-UTRA) is currently under discussion within the 3GPP. As currently specified the DL access technique will be OFDMA, and the UL access technique will be SC-FDMA.

One specification of interest to the ensuing discussion of the background, and the exemplary embodiments of this invention, is 3GPP TS 36.300, V8.5.0 (2008-05), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), incorporated by reference herein in its entirety.

FIG. 2 reproduces FIG. 4 from 3GPP TS 36.300, V8.5.0 (2008-05) and shows various eNBs, MME/SAE gateways, and the interfaces (S1, X2) between these components in the E-UTRAN (LTE) context.

For LTE a scattered eNB deployment is considered as being an essential pre-requisite. Due to the fact that there can be different HO algorithms of different vendors of eNBs (and UEs), the potential for occurrence of the ping pong effect is significant.

Briefly, the ping pong effect can occur if a UE has very similar radio conditions towards two eNBs, thus eNB_A may handover the UE to eNB_B, which then results in a handover in the opposite direction (from eNB_B to eNB_A). Handover decisions are typically based on certain fixed, often vendor specific, differences in cell signal levels, which are potentially different in base stations from different vendors, in combination with momentary variations of either of the links. As a result, at any given time one of the base stations may appear preferable to the other and fulfill the HO requirement. As can be appreciated, this results in additional and unnecessary signaling load on the wireless and wired interfaces, as well as S1 re-direction and UE data forwarding via the X2 interface, even though both eNBs would be capable of serving that particular UE.

Although the ping pong problem is known in current wireless networks (non-LTE networks), it is believed that scattered Node B deployments are intentionally avoided by the network operators. In a single vendor Node B area all Node Bs are based on and operate with the same HO-related algorithms. This can mitigate the ping pong problem to a large extent (which may be handled simply by the use of timers), since the Node Bs may be assumed to operate using the same algorithm and HO decision criteria. In the idle mode cell individual (fixed) offsets may be defined to minimize the ping pong occasions due to link quality fluctuations. Nevertheless, ping ponging still occurs in certain scenarios, resulting in a high signaling load.

SUMMARY

The foregoing and other problems are overcome, and other advantages are realized, by the use of the exemplary embodiments of this invention.

In a first aspect the exemplary embodiments of this invention provide a method that includes handing over a user equipment from a first network access node to a second network access node and not considering the first network access node as a handover candidate from the second network access node for some period of time unless there is indicated a change in channel conditions that exceed a threshold in one or both of time and an amount of change.

In another aspect the exemplary embodiments of this invention provide a computer-readable memory medium that stores computer program instructions, where execution of the instructions results in performance of operations comprising handing over a user equipment from a first network access node to a second network access node; and not considering the first network access node as a handover candidate from the second network access node for some period of time unless there is indicated a change in channel conditions that exceed a threshold in one or both of time and an amount of change.

In another aspect the exemplary embodiments of this invention provide an apparatus that comprises a first interface configured to conduct bidirectional wireless communication with a user equipment; a second interface configured to conduct bidirectional communication with a first network access node to hand over the user equipment from the first network access node to a second network access node; and a controller configured to not consider the first network access node as a handover candidate from the second network access node for some period of time unless there is indicated a change in channel conditions that exceed a threshold in one or both of time and an amount of change.

In a further aspect the exemplary embodiments of this invention provide an apparatus that comprises means for handing over a user equipment from a first network access node to a second network access node; means for starting a timer means to run for a predetermined period of time in response to operation of the means for handing over; means for considering the first network access node as a handover candidate from the second network access node only after said timer means expires and means for adjusting the predetermined period of time in order to reduce an occurrence of ping ponging of the user equipment between the first network access node and the second network access node.

DETAILED DESCRIPTION

Figure 1:
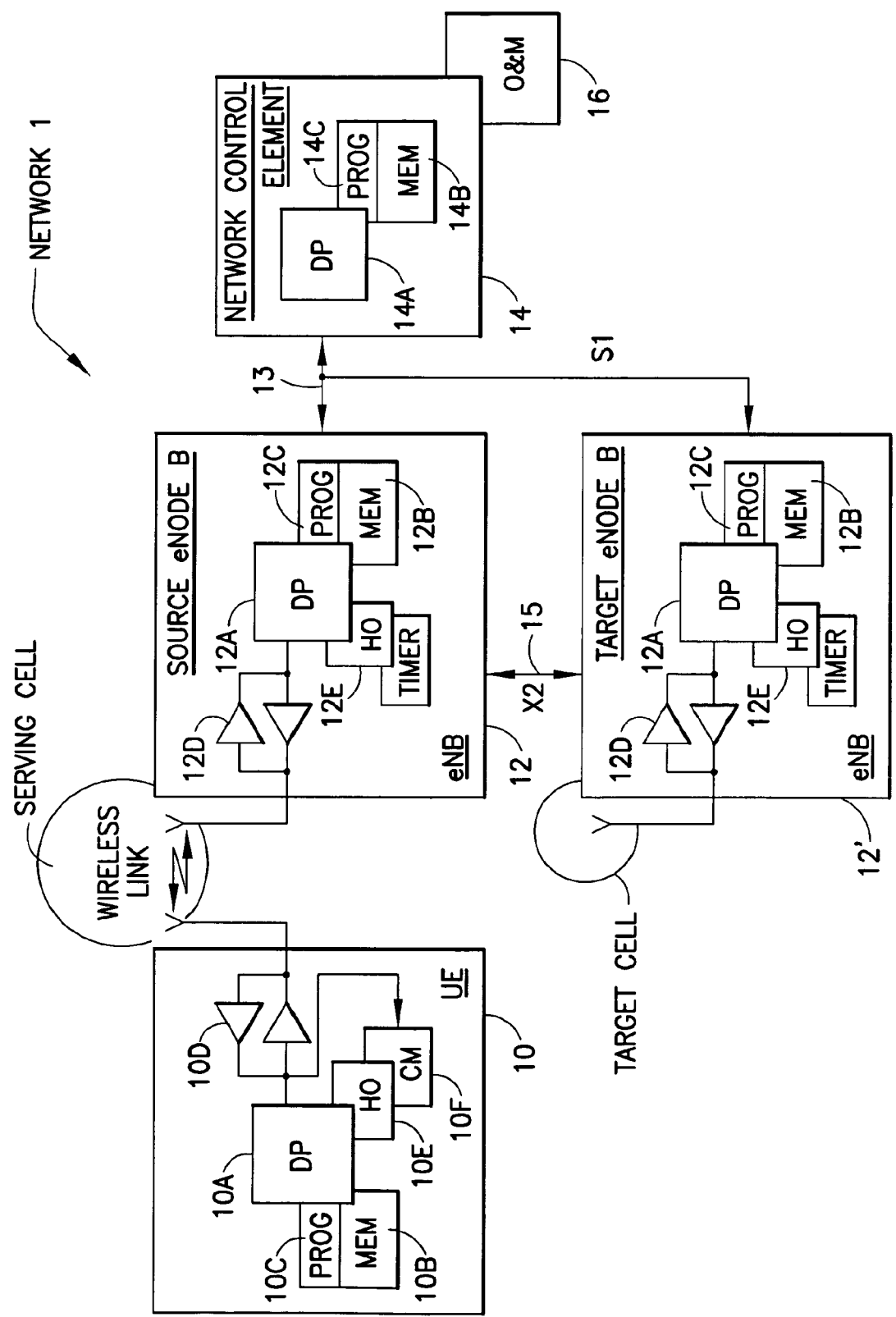
FIG. 1 shows a simplified block diagram of various electronic devices that are suitable for use in practicing the exemplary embodiments of this invention.

Reference is made first to FIG. 1 for illustrating a simplified block diagram of various apparatus and electronic devices that are suitable for use in practicing the exemplary embodiments of this invention. In FIG. 1 a wireless network 1 is adapted for communication with an apparatus, such as a mobile communication device which may be referred to as a UE 10, via a network access node, such as a Node B (base station), and more specifically an eNB 12. The network 1 may include a network control element (NCE) 14 that may include the MME/S-GW functionality shown in FIG. 2, and which provides connectivity with a network such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the S1 interface shown in FIG. 2. The network control element 14 will also includes at least one DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail.

Shown for completeness in FIG. 1 is at least one second eNB, referred to as 12'. During a HO event the eNB 12 may be considered the Source eNB, i.e., the eNB to which the UE 10 is currently connected and communicating in the associated serving cell, and the eNB 12' may be considered the Target eNB, i.e., the eNB to which the UE 10 is to be connected and communicating with in the target cell after the HO procedure is completed. In practice the coverage areas of the serving cell and the target cell may at least partially overlap one another. The UE 10 will typically experience different RF channel propagation conditions as it moves within a given cell, and well as from cell-to-cell.

Figure 2:
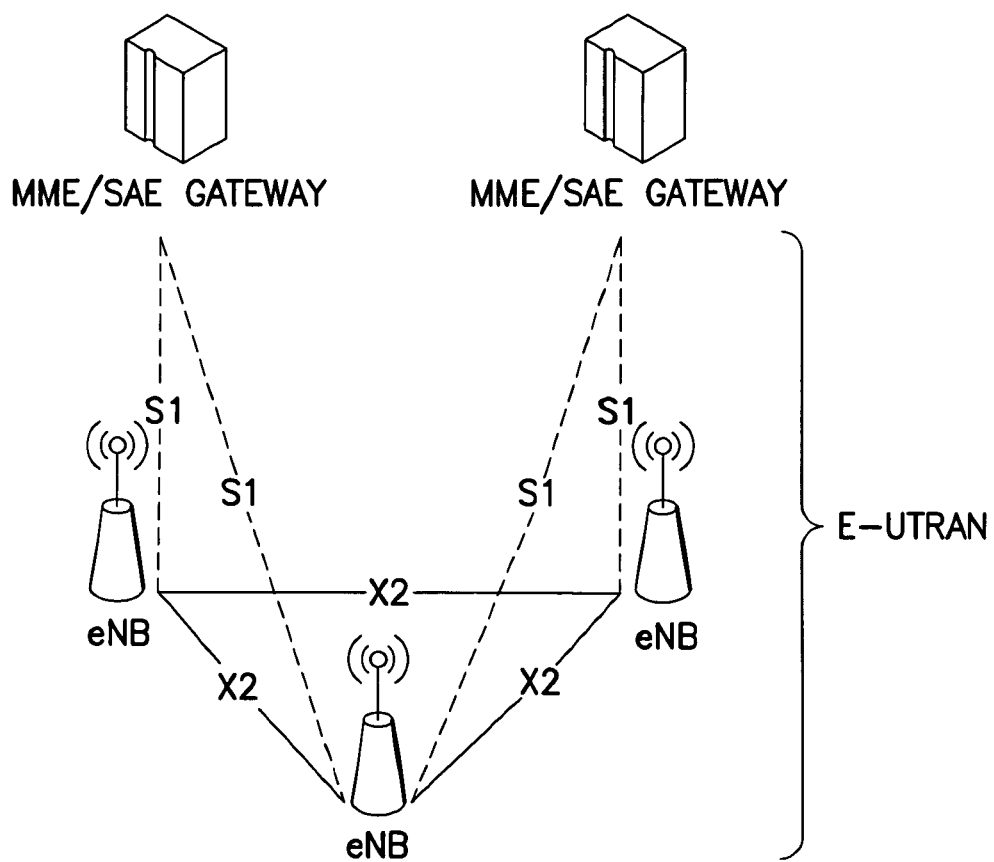
FIG. 2 reproduces FIG. 4 from 3GPP TS 36.300, V8.5.0 (2008-05).

The eNBs 12 and 12' are shown coupled together through a data link 15, which implements the X2 interface shown in FIG. 2.

Each eNB 12, 12' may be assumed to include a HO function or unit 12E that is constructed and operated in accordance with the exemplary embodiments of this invention, as discussed in greater detail below. The UE 10 may also be assumed to include a HO function or unit 10E that operates with the HO functions 12E of the eNBs 12, 12'. The UE 10 may be further assumed to include a channel measurement (CM) function or unit 10F with which it may generate at least channel measurement information to be sent to the eNB 12, as specified by received measurement-related parameters and instructions. The channel measurement information is subsequently reported to the serving eNB 12, such as by using channel quality indicator (CQI) signaling.

Note that the eNBs 12 and 12' may or may not be identically constructed and operated, e.g., they may be provided by different vendors. In this case they may attempt to operate with different HO algorithms and HO decision criteria.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the DP 12A of the eNBs 12 and 12', or by hardware, or by a combination of software and hardware (and firmware).

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on multi-core processor architectures, as non-limiting examples.

Describing now the exemplary embodiments of this invention in even further detail, in a first aspect thereof there is provided a prolonged handover time for the former serving eNB(s) of the UE 10. What this entails is, in the case where the UE 10 was just handed over from one eNB (e.g., eNB 12) to another eNB (e.g., eNB 12'), the former eNB (eNB 12 in this case) is not considered by the eNB 12' for some period of time (e.g., x-seconds) in the measurements made by the CM 10F of the UE 10, unless the channel conditions experience a rapid and significant change (e.g., by some predetermined and possibly variable number of dB of received signal strength).

Alternatively, if the UE 10 measures the cell of the former eNB 12, and it is found to be a suitable HO candidate, the eNB 12' does not institute or begin the HO procedure for x-seconds. The value of x may be configurable, and increased based on an occurrence of an undesirable ping pong HO occurring.

In a second aspect thereof there is provided an increased HO decision point. In this exemplary embodiment if a handover from eNB 12 to eNB 12' has occurred, e.g., based on a difference of 2dB of measured signal strength, and the UE 10 then ping pongs back to eNB 12, for a next HO between these two cells for this particular UE 10 the signal strength threshold is increased by some amount y, that is, the new threshold at which a HO will be triggered is 2dB+y, where y is an integer number of dB (e.g., 1, such that the new threshold is 3.0db) or a fraction of one dB (e.g., 0.5, such that the new threshold is 2.5dB).

The value of y may be a configurable value, such as one provided by an O&M function 16, or one evaluated by the eNB 12, such as by starting with a small value of y and increasing the value of y by, for example, 2y after each ping pong occurrence experienced by the UE 10. The increased HO decision point, e.g., the value of y where the UE 10 no longer returns to the previous eNB, may be considered as an optimized value by the eNBs 12, 12' if the same or about the same value is observed for some number of UEs 10. Thus, this procedure may be regarded as a wireless network HO self-optimization process.

Note that the initial value of y could be provided by the O&M function 16, and then the eNB 12 could subsequently modify the originally provided value during operation.

A timer (a software timer, a hardware timer, or a combination of same) associated with the eNB 12, 12' HO function 12E can be provided, the timer being related to ping ponging of the UE 10. For example, the occurrence of ping ponging can be stopped or at least reduced by adjusting the expiration period of the timer. The time may be related to the HO decision making process (in the HO functions 12E), or related directly to the measurements made to avoid the UE 10 making unnecessary measurements. However, the latter case may involve RRC signaling towards the UE 10, while first approach would be contained within at least the eNBs 12 and would not require the use of UE 10 signaling.

With regard to the increment value y used in the HO decision process, after having performed a HO for a certain difference in values, and for the case where the UE 10 returns to the first serving eNB 12, the HO is executed the next time only if the difference is some number of "units" larger than it was during the previous HO. The difference value is preferably increased until no ping ponging of the UE 10 takes place.

It should be noted that it is within the scope of these exemplary embodiments to use a hybrid HO approach at the eNB, such as by considering the time (possibly variable) since the UE was last handed over, and further considering the difference in the measured signal strength (also possibly variable). That is, the eNB HO function 12E may consider both the values of x and y when making the HO decision, and may vary one or both as desired to minimize or eliminate the ping ponging of the UE 10.

Advantages that are realized by the use of the foregoing techniques and procedures include providing a robust procedure to avoid ping ponging during LTE active mobility operation, and that require only a modest standardization effort.

Based on the foregoing it should be apparent that the exemplary embodiments of this invention provide a method, apparatus and computer program(s), embodied in computer-readable memory medium, to operate an eNB with a UE to perform a HO that avoids or minimizes ping ponging of the UE.

Based on the foregoing it should be apparent that the exemplary embodiments of this invention provide a method, apparatus and computer program product(s) to optimize HO decision making between individual eNBs based on statistical evaluations of a plurality of UE HO processes, with the result being minimizing or at least reducing the occurrence of ping ponging of the UE. For example, an ability to vary the HO decision making threshold is well suited for network self-optimization purposes.

Figure 3:
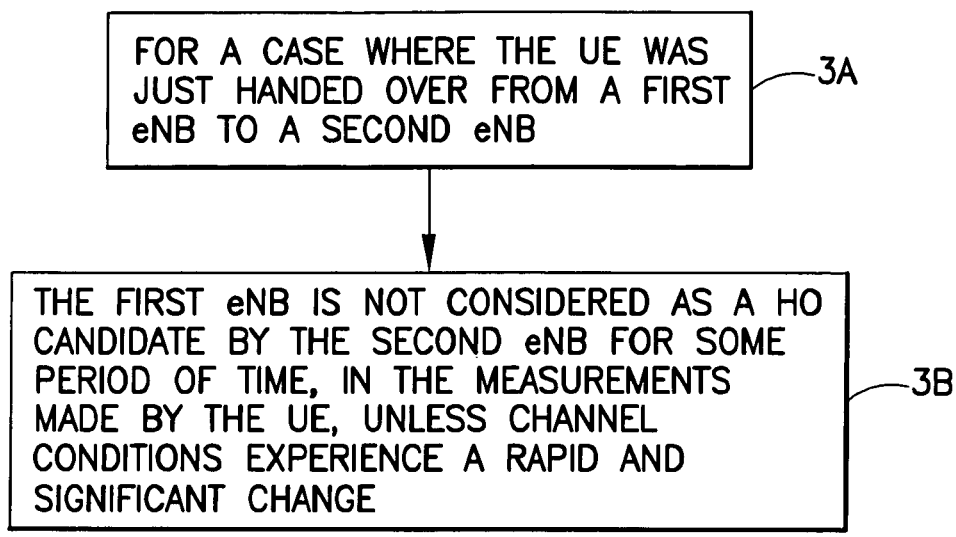
FIGS. 3-5 are each a logic flow diagram that illustrates a method, and operation of computer program instructions, in accordance with exemplary embodiments of this invention.

In accordance with a method, and referring to FIG. 3, for a case where the UE was just handed over from a first eNB to a second eNB (Block 3A), the first eNB is not considered as a HO candidate by the second eNB for some period of time, in the measurements made by the UE, unless channel conditions experience a rapid and significant change (Block 3B).

Figure 4:
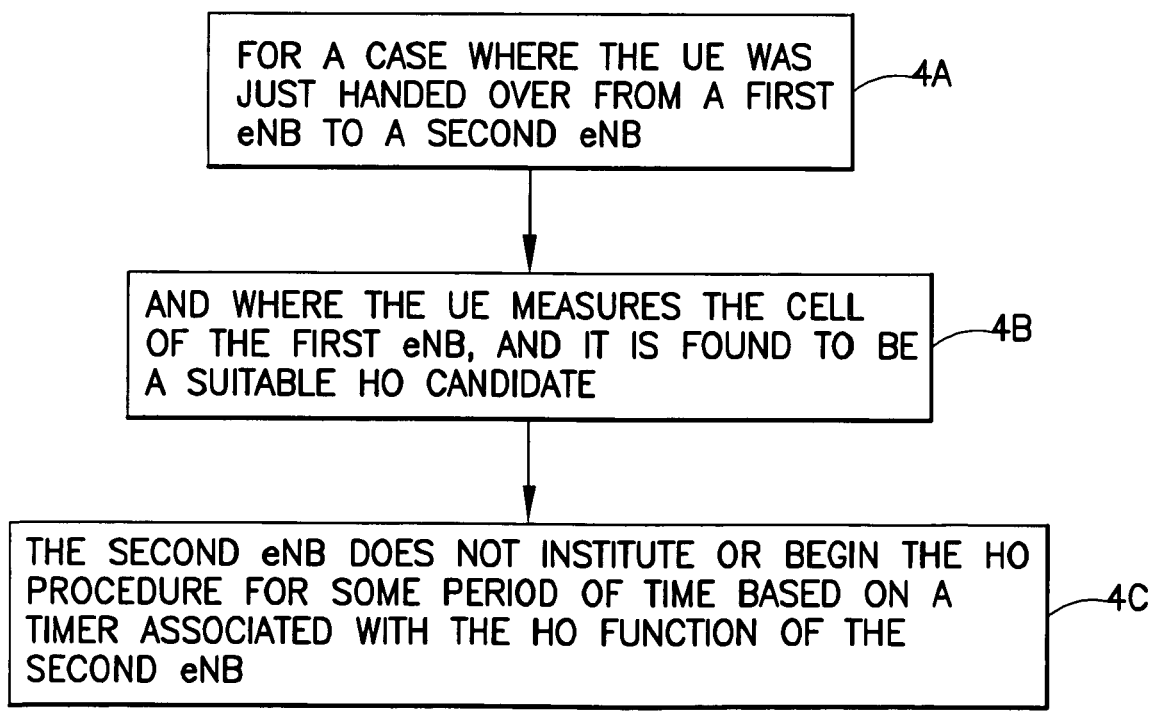

In accordance with a further method, and referring to FIG. 4, for a case where the UE was just handed over from a first eNB to a second eNB (Block 4A), and where the UE measures the cell of the first eNB, and it is found to be a suitable HO candidate (Block 4B), the second eNB does not institute or begin the HO procedure for some period of time based on a timer associated with the HO function of the second eNB (Block 4C).

In the method of the preceding paragraph, where the period of time is variable, and is increased in response to an occurrence of a ping pong HO occurring back to the first eNB.

Figure 5:
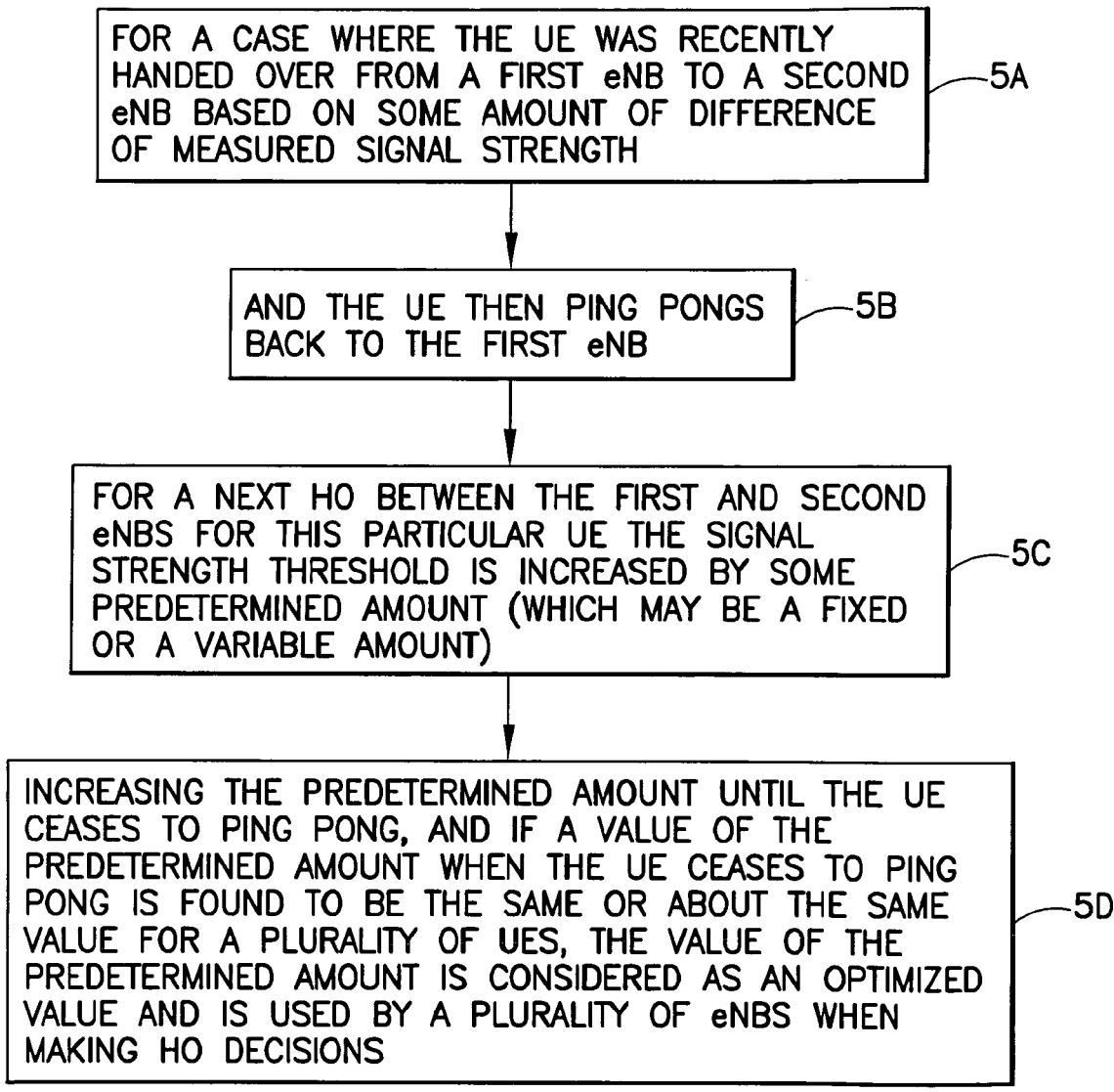

In accordance with a further method, and referring to FIG. 5, for a case where the UE was just handed over from a first eNB to a second eNB based on some amount of difference of measured signal strength (Block 5A), and the UE then ping pongs back to the first eNB (Block 5B), for a next HO between the first and second eNBs for this particular UE the signal strength threshold is increased by some predetermined amount (Block 5C).

The method of the preceding paragraph, where the predetermined amount is at least one of configured to the eNB and determined by the eNB.

The method of the preceding paragraphs, where the predetermined amount is incrementally increased until the UE ceases to ping pong.

The method of the preceding paragraph, where a value of the predetermined amount when the UE ceases to ping pong, if found to be the same or about the same value for a plurality of UEs, is considered as an optimized value and is used by a plurality of eNBs when making HO decisions (Block 5D).

The various blocks shown in FIGS. 3, 4 and 5 may be considered as method steps, and may also be viewed as operations that result from execution of computer program code, and/or as operations performed by a plurality of coupled logic circuit elements constructed to carry out the associated function(s).

For example, in accordance with an apparatus an eNB comprises means, such as a HO function or module, that is configurable to respond to a case where the UE was just handed over from a first eNB to a second eNB for not considering the first eNB as a HO candidate by the second eNB for some period of time, in the measurements made by the UE, unless channel conditions experience a rapid and significant change.

In accordance with a further apparatus, an eNB comprises means, such as a HO function or module, that is configurable for responding to a case where the UE was just handed over from a first eNB to a second eNB, where the UE measures the cell of the first eNB and it is found to be a suitable HO candidate, for causing the second eNB to not institute or begin the HO procedure for some period of time based on a timer associated with the HO function or module of the second eNB.

In the apparatus of the preceding paragraph, where the period of time is variable, and is increased in response to an occurrence of a ping pong HO occurring back to the first eNB.

In accordance with a further apparatus, an eNB comprises means, such as a HO function or module, that is configurable for responding to a case where the UE was just handed over from a first eNB to a second eNB based on some amount of difference of measured signal strength, and is further configurable to respond to an event where the UE then ping pongs back to the first eNB, to increase the signal strength threshold by some predetermined amount for making a next HO decision between the first and second eNBs for this particular UE.

The apparatus of the preceding paragraph, where the predetermined amount is at least one of configured to the eNB and determined by the eNB.

The apparatus of the preceding paragraphs, where the predetermined amount is incrementally increased until the UE ceases to ping pong.

The apparatus of the preceding paragraph, where a value of the predetermined amount when the UE ceases to ping pong, if found to be the same or about the same value for a plurality of UEs, is considered as an optimized value and is used by the HO function or module of a plurality of eNBs when making HO decisions.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should be appreciated that at least some aspects of the exemplary embodiments of the inventions may be practiced in various components such as integrated circuit chips and modules. That is, the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems, as well as in inter-RAT embodiments where there may be network access nodes associated with different network access technologies.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, any specific names used for any described parameters are not intended to be limiting in any respect, as these parameters may be identified by any suitable names. Further, any formulas and expressions that use these various parameters may differ from those expressly disclosed herein.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    in response to performing a first hand over of a user equipment to a first network access node from a second network access node using a first threshold amount of time and performing a second hand over of the user equipment from the first network access node to the second network access node, creating an updated first threshold amount of time;
    in response to a determination that the first network access node is suitable for a third handover procedure, determining, at the second network access node, whether an amount of time since the second hand over exceeds the updated first threshold amount and determining, at the second network access node, whether there is a change in a channel condition between the user equipment and the first network access node that exceeds a second threshold amount;
    in response to a determination that the amount of time since the second hand over from the first network access node does not exceed the updated first threshold amount and to a determination that there is not a change in the channel condition between the user equipment and the first network access node that exceeds the second threshold amount, avoiding consideration of the first network access node as a handover candidate from the second network access node; and
    performing a wireless network self-optimization process in response to a determination being made that a threshold value where the user equipment ceases to ping pong between the first network access node and the second network access node is approximately the same value for a plurality of user equipment, by considering the threshold value as an optimized value that is used by a plurality of network access nodes when making user equipment handover decisions.

2. The method of claim 1, where the change in the channel condition is indicated by channel measurements received by the second access node.

3. The method of claim 1, where the amount of time is indicated by a tinier that comprises part of the second network access node.

4. The method of claim 1, further comprising receiving a measurement report at the second access node that indicates that the first network access node is a suitable handover candidate.

5. The method of claim 1, where creating an updated first threshold amount of time comprises increasing the first threshold amount of time.

6. The method of claim 1, further comprising, in response to performing the first hand over of the user equipment to the first network access node from the second network access node using a value of a difference in signal strength that is measured by the user equipment between the first network access node and the second network access node and performing the second hand over of the user equipment from the first network access node to the second network access node, increasing the value of the difference in signal strength by some certain amount.

7. The method of claim 6, where the certain amount is a value that is configured to the first network access node.

8. The method of claim 6, where the certain amount is a value that is determined by the first network access node.

9. The method of claim 6, where a value of the certain amount is incrementally increased until the user equipment ceases to ping pong between the first network access node and the second network access node.

10. The method of claim 1, where the first network access node is provided by a first vendor, and
where the second network access node is provided by a second vendor.

11. A non-transitory computer-readable memory medium that stores computer program instructions, where execution of the instructions results in performance of operations comprising:
in response to performing a first hand over of a user equipment to a first network access node from a second network access node using a first threshold amount of time and performing a second hand over of the user equipment from the first network access node to the second network access node, creating an updated first threshold amount of time;
in response to a determination that the first network access node is suitable for a third handover procedure, determining, at the second network access node, whether an amount of time since the second hand over exceeds the updated first threshold amount and determining, at the second network access node, whether there is a change in a channel condition between the user equipment and the first network access node that exceeds a second threshold amount;
in response to a determination that the amount of time since the second hand over from the first network access node does not exceed the updated first threshold amount and to a determination that there is not a change in the channel condition between the user equipment and the first network access node that exceeds the second threshold amount, avoiding consideration of the first network access node as a handover candidate from the second network access node; and
performing a wireless network self-optimization process in response to a determination being made that a threshold value where the user equipment ceases to ping pong between the first network access node and the second network access node is approximately the same value for a plurality of user equipment, by considering the threshold value as an optimized value that is used by a plurality of network access nodes when making user equipment handover decisions.

12. The non-transitory computer-readable memory medium of claim 11, where the change in the channel condition is indicated by channel measurements received by the second access node.

13. The non-transitory computer-readable memory medium of claim 11, where the amount of time is indicated by a timer that comprises part of the second network access node.

14. The non-transitory computer-readable memory medium of claim 11, further comprising receiving at the second access node a measurement report that indicates that the first network access node is a suitable handover candidate.

15. The non-transitory computer-readable memory medium of claim 11, where creating an updated first threshold amount of time comprises increasing the first threshold amount of time.

16. The non-transitory computer-readable memory medium of claim 11, further comprising, in response to performing the first hand over of the user equipment to the first network access node from the second network access node using a value of a difference in signal strength that is measured by the user equipment between the first network access node and the second network access node and performing the second hand over of the user equipment from the first network access node to the second network access node, increasing the value of the difference in signal strength by some certain amount.

17. The non-transitory computer-readable memory medium of claim 16, where the certain amount is a value that is configured to the first network access node.

18. The non-transitory computer-readable memory medium of claim 16, where the certain amount is a value that is determined by the first network access node.

19. The non-transitory computer-readable memory medium of claim 16, where a value of the certain amount is incrementally increased until the user equipment ceases to ping pong between the first network access node and the second network access node.

20. The non-transitory computer-readable memory medium of claim 11, where the first network access node is provided by a first vendor, and
where the second network access node is provided by a second vendor.

21. An apparatus, comprising a processor; and a memory storing computer program code, the memory and the computer program code configured to, with the processor, cause the apparatus to perform at least the following actions:
in response to performing a first hand over of a user equipment to a first network access node from a second network access node using a first threshold amount of time and performing a second hand over of the user equipment from the first network access node to the second network access node, creating an updated first threshold amount of time;
in response to a determination that the first network access node is suitable for a third handover procedure, determining, at the second network access node, whether an amount of time since the second hand over exceeds the updated first threshold amount and determining, at the second network access node, whether there is a change in a channel condition between the user equipment and the first network access node that exceeds a second threshold amount;
in response to a determination that the amount of time since the second hand over from the first network access node does not exceed the updated first threshold amount and to a determination that there is not a change in the channel condition between the user equipment and the first network access node that exceeds the second threshold amount, avoiding consideration of the first network access node as a handover candidate from the second network access node; and the memory and the computer program code being configured, with the processor, to cause the apparatus to perform a wireless network self-optimization process in response to a determination being made that a threshold value where the user equipment ceases to ping pong between the first network access node and the second network access node is approximately the same value for a plurality of user equipment, by considering the threshold value as an optimized value that is used by a plurality of network access nodes when making user equipment handover decisions.

22. The apparatus of claim 21, where the change in the channel condition is indicated by channel measurements received by the second access node via said first interface.

23. The apparatus of claim 21, where the actions further comprise to indicate the amount of time.

24. The apparatus of claim 21, where the actions further comprise to respond to a measurement report that is received via said first interface, the measurement report indicating that the first network access node is a suitable handover candidate.

25. The apparatus of claim 21, where creating an updated first threshold amount of time comprises increasing the first threshold amount of time.

26. The apparatus of claim 21, where the actions further comprise, in response to performing the first hand over of the user equipment to the first network access node from the second network access node using a value of a difference in signal strength between the first network access node and the second network access node, and where the user equipment is handed back to the first network access node and performing the second hand over of the user equipment from the first network access node to the second network access node, to increase the value of the difference in signal strength by some certain amount.

27. The apparatus of claim 26, where the certain amount is a value that is configured to the first network access node.

28. The apparatus of claim 26, where the certain amount is a value that is determined by said controller of said first access node.

29. The apparatus of claim 21, where a value of the certain amount is incrementally increased until the user equipment ceases to ping pong between the first network access node and the second network access node.

30. The apparatus of claim 21, where the first network access node is provided by a first vendor, and
where the second network access node is provided by a second vendor.

31. The apparatus of claim 21, embodied at least partially as an integrated circuit.

32. A method, comprising:
handing over a user equipment from a first network access node to a second network access node based on a difference in signal strength that is received in a report from the user equipment exceeding a threshold value, the difference in signal strength being between the first network access node and the second network access node;

receiving a hand over of the same user equipment at the first network access node from the second network access node;

in response to handing over and then receiving the hand over of the same user equipment, at the first network access node, increasing the threshold value by some certain amount so that the user equipment is avoided from being handed over to the second access node again unless the difference in the signal strength between the first network access node and the second network access node is equal to or exceeds the increased value, where an initial value of the certain amount is configured to the first network access node or where the initial value of the certain amount is determined by a controller of the first network access node; and performing a wireless network self-optimization process in response to a determination being made that the threshold value where the user equipment ceases to ping pong between the first network access node and the second network access node is approximately the same value for a plurality of user equipment, by considering the threshold value as an optimized value that is used by a plurality of network access nodes when making user equipment handover decisions.

33. The method of claim 32, where the threshold value is incrementally increased until the user equipment ceases to ping pong between the first network access node and the second network access node.

* * * * *

UNITED STATES PATENT AND TRADEMARK OFFICE
CERTIFICATE OF CORRECTION

PATENT NO.        : 8,693,439 B2
APPLICATION NO.   : 12/231792
DATED             : April 8, 2014
INVENTOR(S)       : Alexander Vesely et al.

It is certified that error appears in the above-identified patent and that said Letters Patent is hereby corrected as shown below:

In the Claims

In Claim 3:
Column 8, line 62, "tinier" should be deleted and --timer-- should be inserted.

Signed and Sealed this
Twenty-fourth Day of June, 2014

Michelle K. Lee
*Deputy Director of the United States Patent and Trademark Office*